(12) United States Patent
Zakarias et al.

(10) Patent No.: US 8,761,841 B2
(45) Date of Patent: Jun. 24, 2014

(54) PERSONAL CONFERENCING DEVICE

(75) Inventors: Karsten Zakarias, Kobenhavn (DK); Brian Koefoed, Glostrup (DK); Michael Schwartz, Regstrup (DK)

(73) Assignee: GN Netcom A/S (DK)

( * ) Notice: Subject to any disclaimer, the term of this patent is extended or adjusted under 35 U.S.C. 154(b) by 18 days.

(21) Appl. No.: 13/520,857

(22) PCT Filed: Jan. 7, 2011

(86) PCT No.: PCT/EP2011/050163
§ 371 (c)(1),
(2), (4) Date: Nov. 8, 2012

(87) PCT Pub. No.: WO2011/083143
PCT Pub. Date: Jul. 14, 2011

(65) Prior Publication Data
US 2013/0210496 A1   Aug. 15, 2013

Related U.S. Application Data

(60) Provisional application No. 61/293,486, filed on Jan. 8, 2010.

(51) Int. Cl.
*H04M 1/00* (2006.01)
*H04M 3/42* (2006.01)

(52) U.S. Cl.
USPC ........................................ 455/569.1; 455/416

(58) Field of Classification Search
USPC .................... 455/416, 456.1, 569.1
See application file for complete search history.

(56) References Cited

U.S. PATENT DOCUMENTS

| | | | |
|---|---|---|---|
| 5,983,073 A * | 11/1999 | Ditzik | ......................... 455/11.1 |
| 2008/0280561 A1 | 11/2008 | Lin | |
| 2009/0312068 A1 | 12/2009 | Kuo | |

FOREIGN PATENT DOCUMENTS

| | | |
|---|---|---|
| CN | 1921665 | 2/2007 |
| WO | WO 2009/026575 | 2/2009 |

OTHER PUBLICATIONS

Chinese Office Action issued on Jul. 3, 2013 by the State Intellectual Property Office of People's Republic of China for corresponding Chinese Application No. 201180012772.1.

* cited by examiner

*Primary Examiner* — Joel Ajayi
(74) *Attorney, Agent, or Firm* — Altera Law Group, LLC

(57) ABSTRACT

A personal conferencing device (12) having a base unit (14) and a headset/handset (5), wherein the base unit (14) comprises a first interface (4) to a telephone system, a headset/handset receiving part (19) for receiving a headset/handset (5), and the headset/handset (5) comprises a base connection (31) adapted to be received by the receiving part (19), at least a first microphone (7) for receiving audio from a headset/handset user, and at least a first headset/handset speaker (8) for providing audio to a headset/handset user, a position detecting device (10) for detecting a position and/or a state of the headset/handset (5), and a second headset/handset speaker (9), wherein audio is provided to a headset/handset user via the second headset/handset speaker (9) in response to a first signal provided from the position detecting device (10) whereby the user can choose between a private mode using the at least first headset/handset speaker and a conference mode using the second headset/handset speaker.

16 Claims, 16 Drawing Sheets

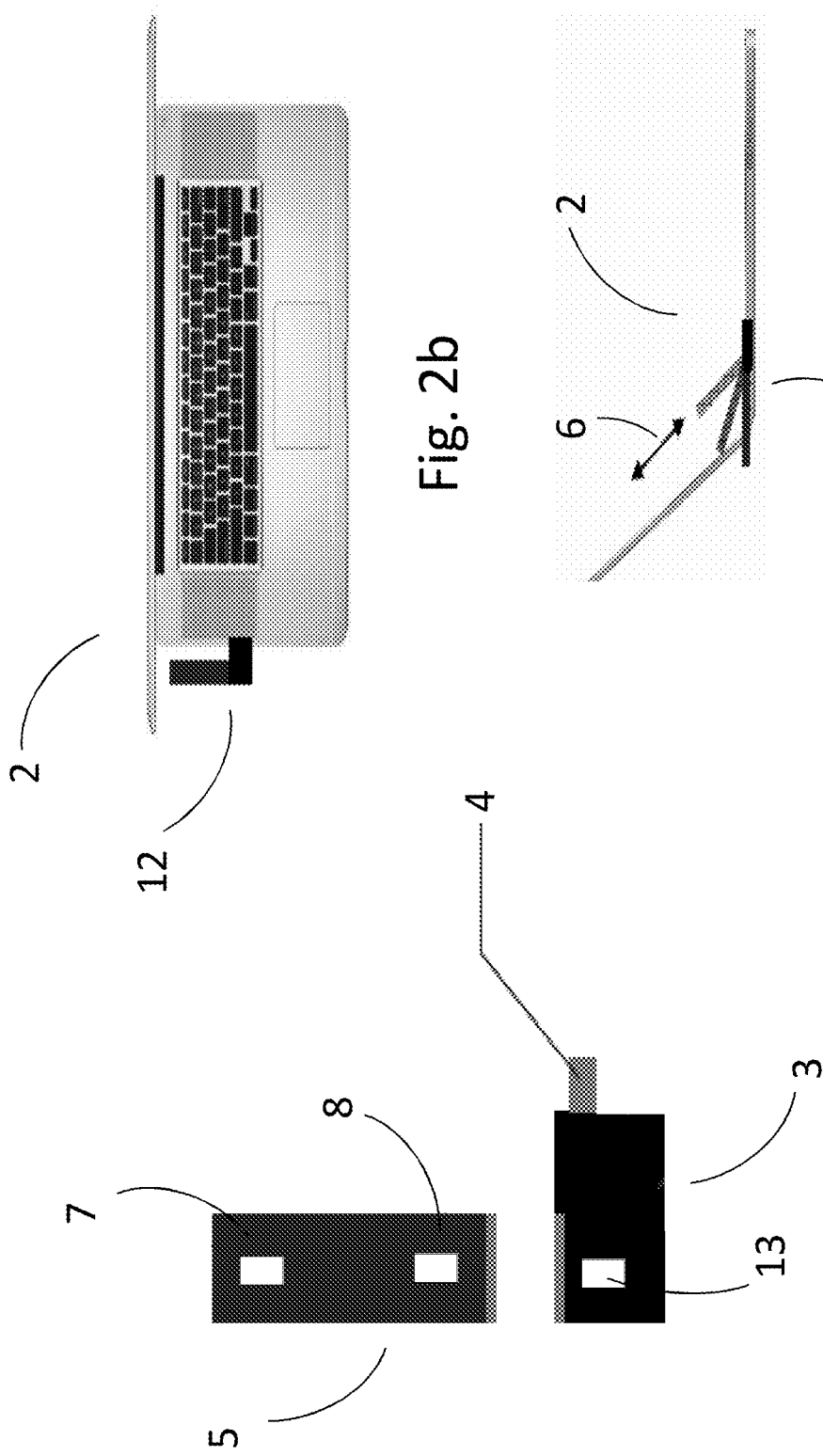

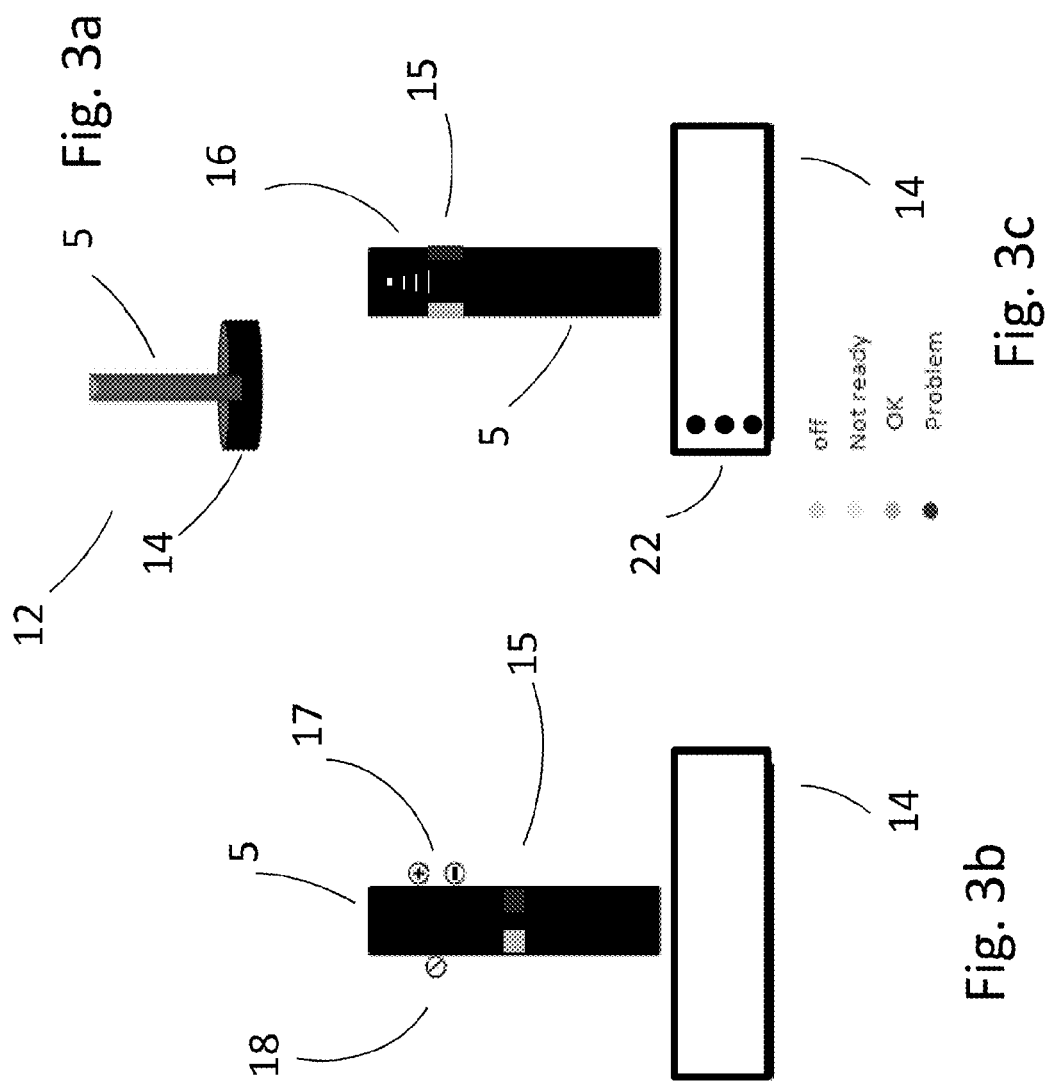

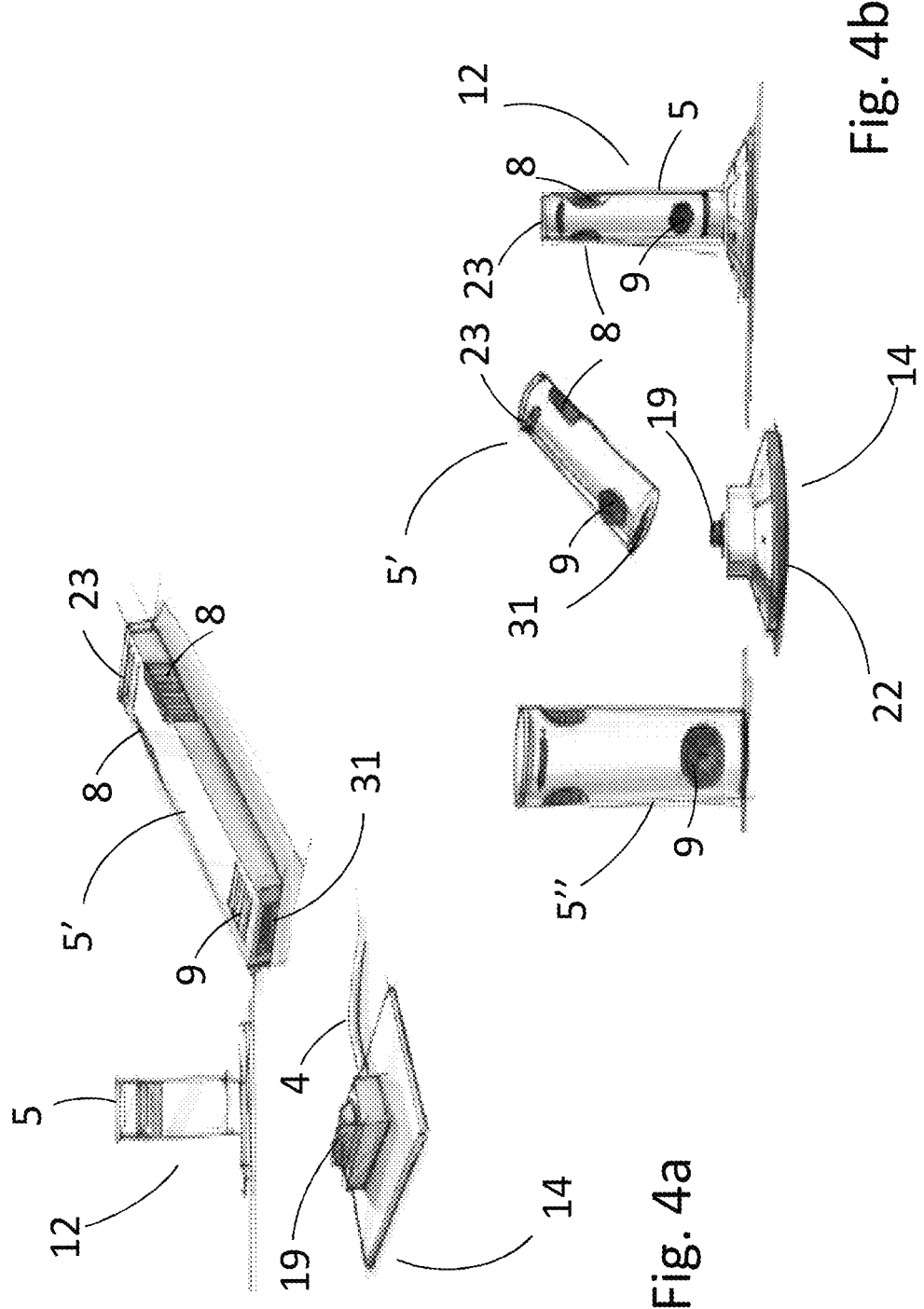

Figure 1:
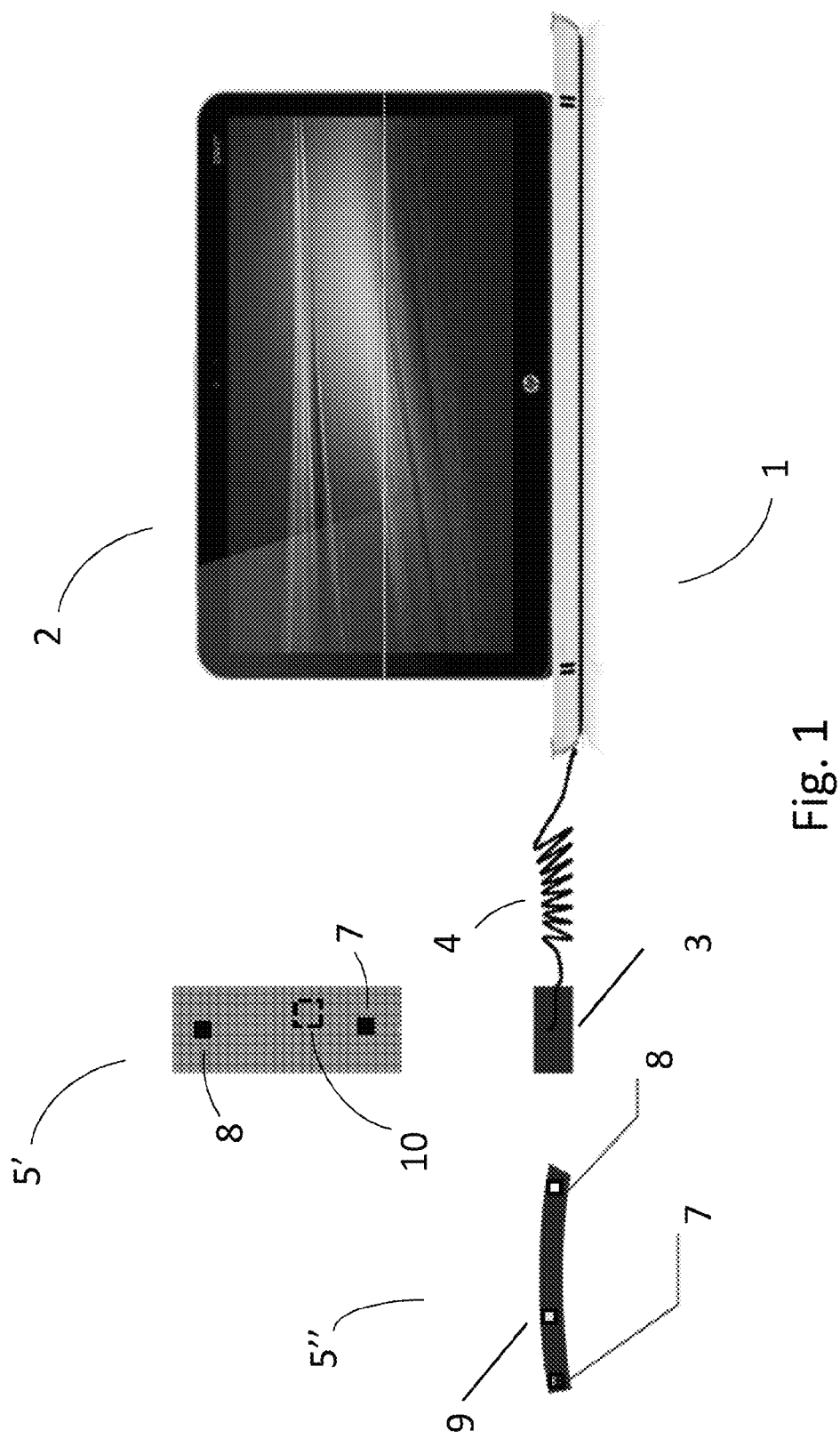

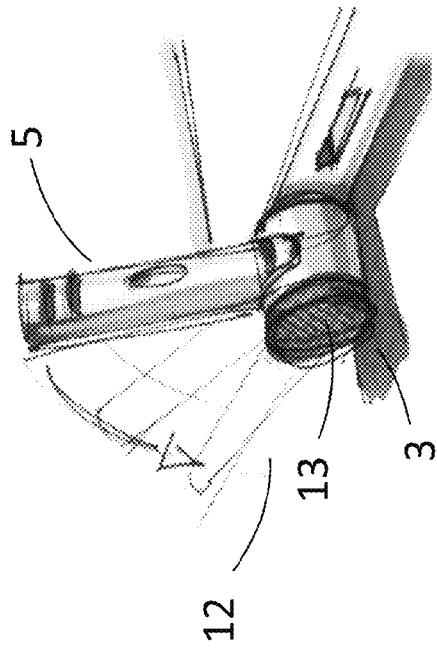
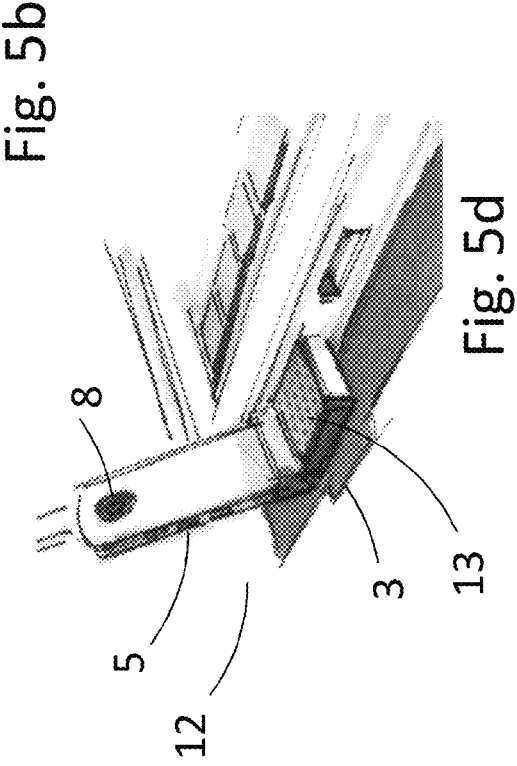
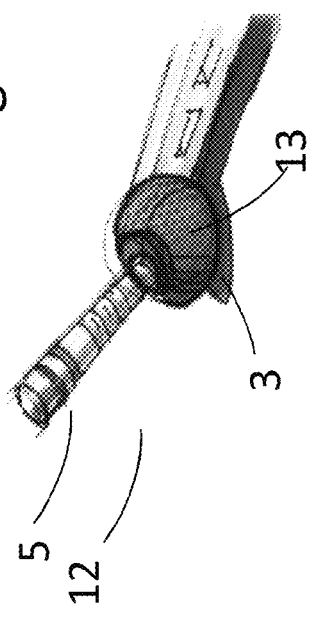
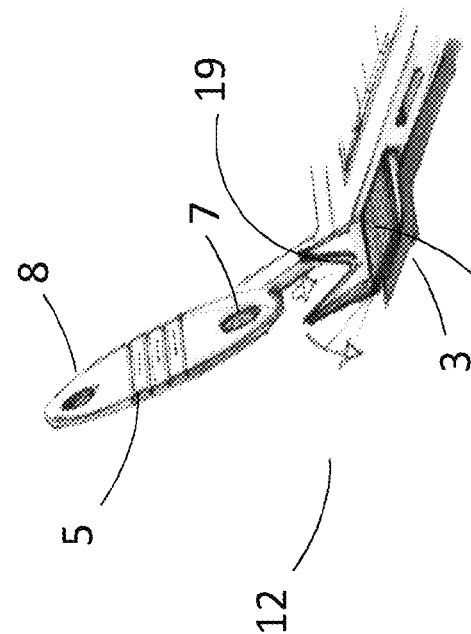

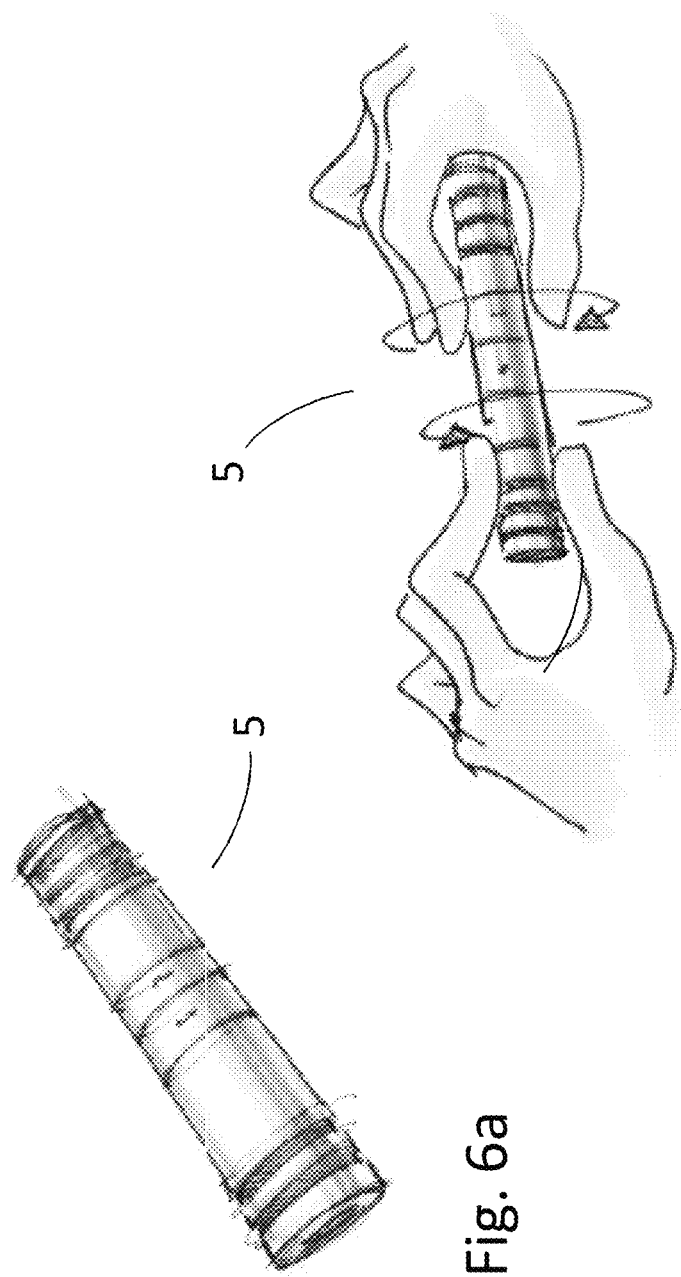

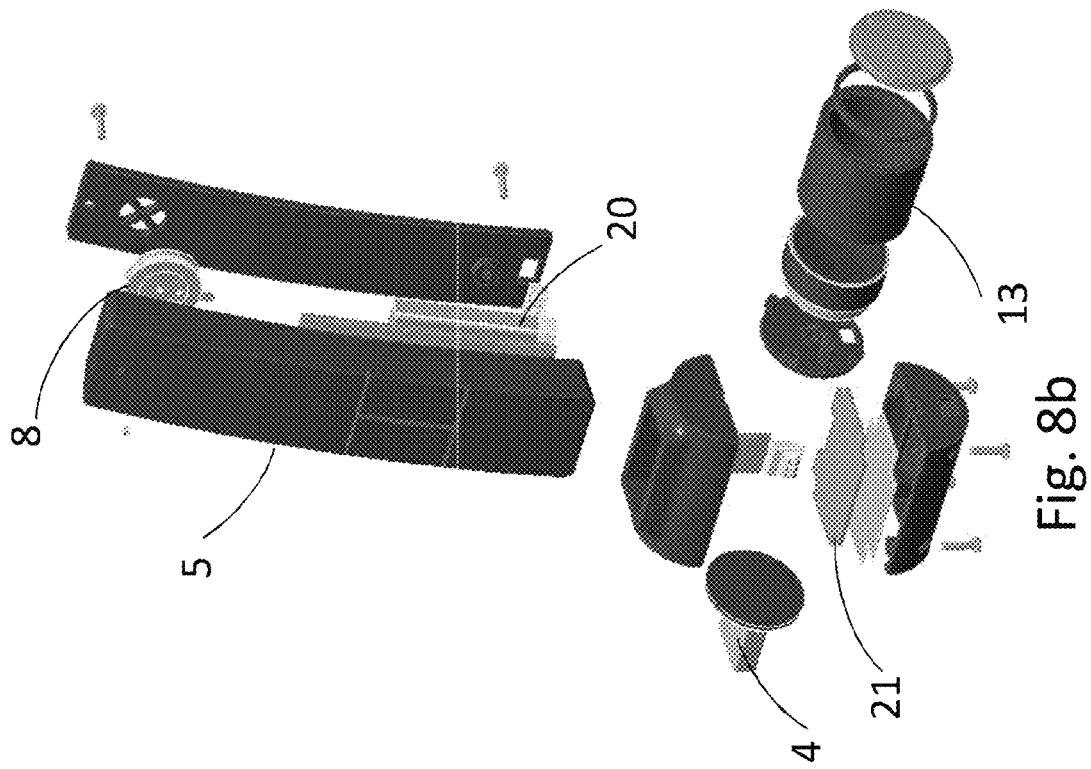
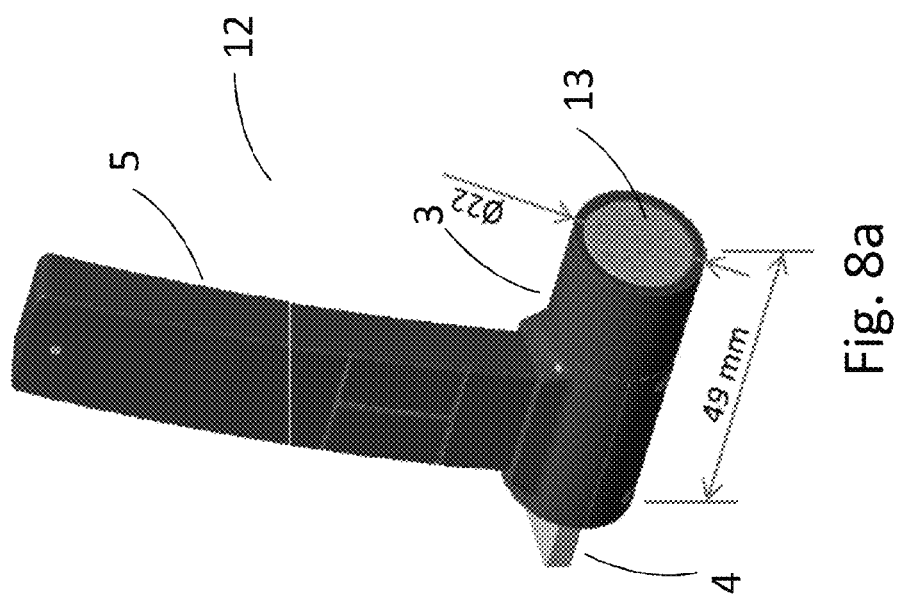

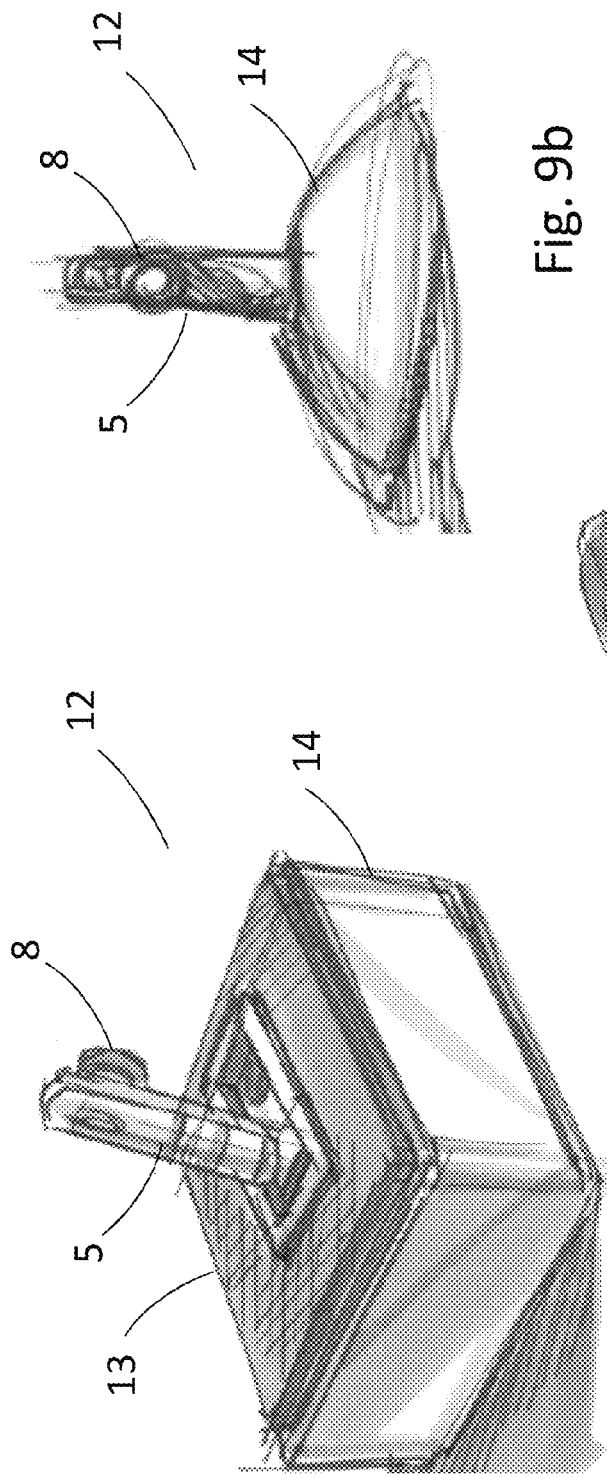
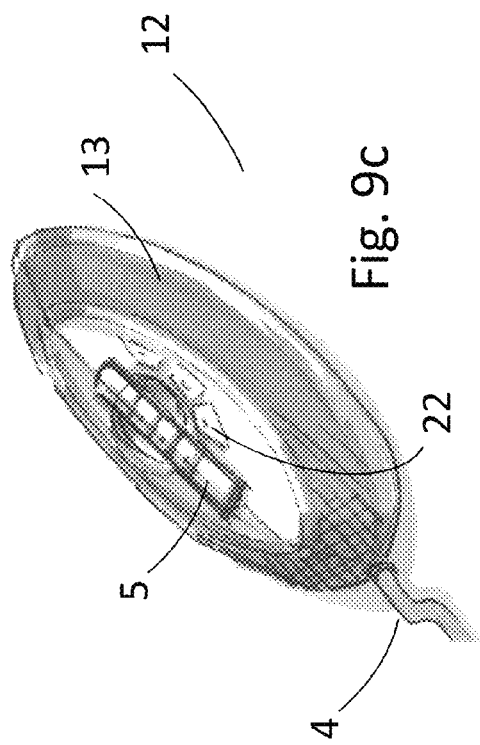
Fig. 9a
Fig. 9b
Fig. 9c

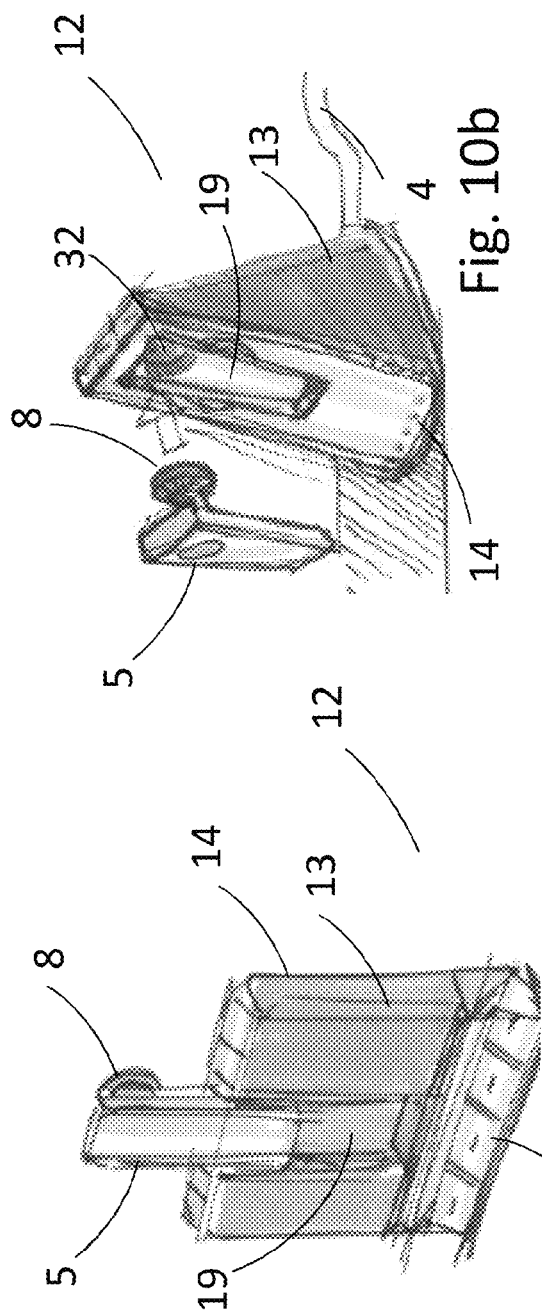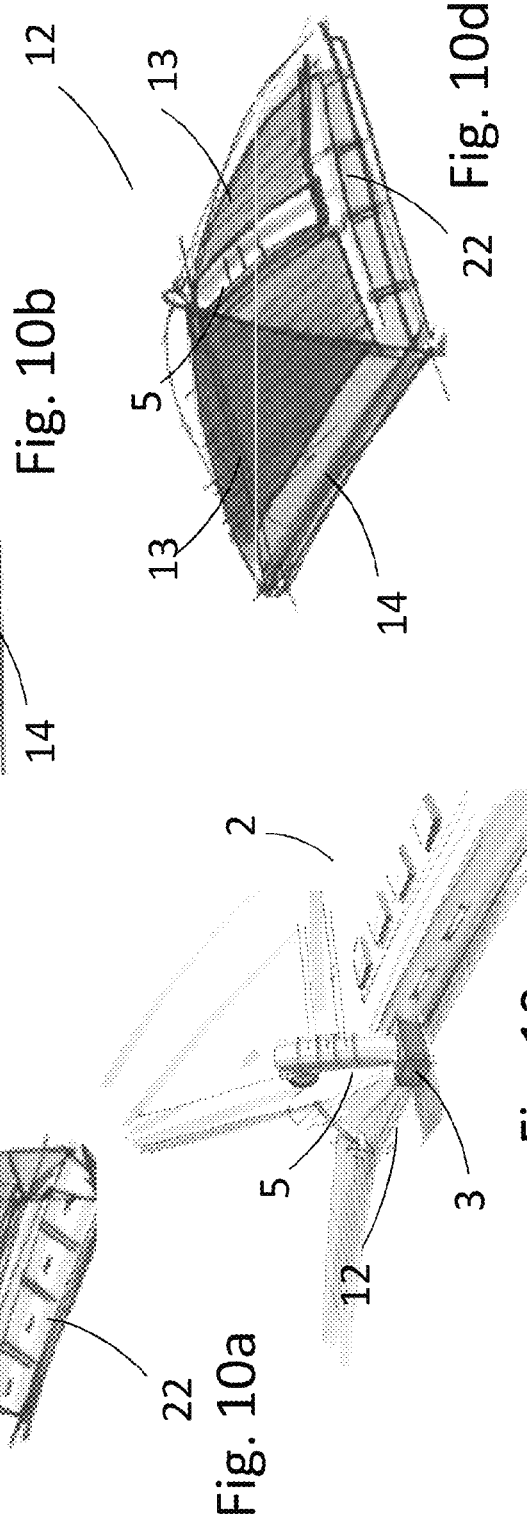

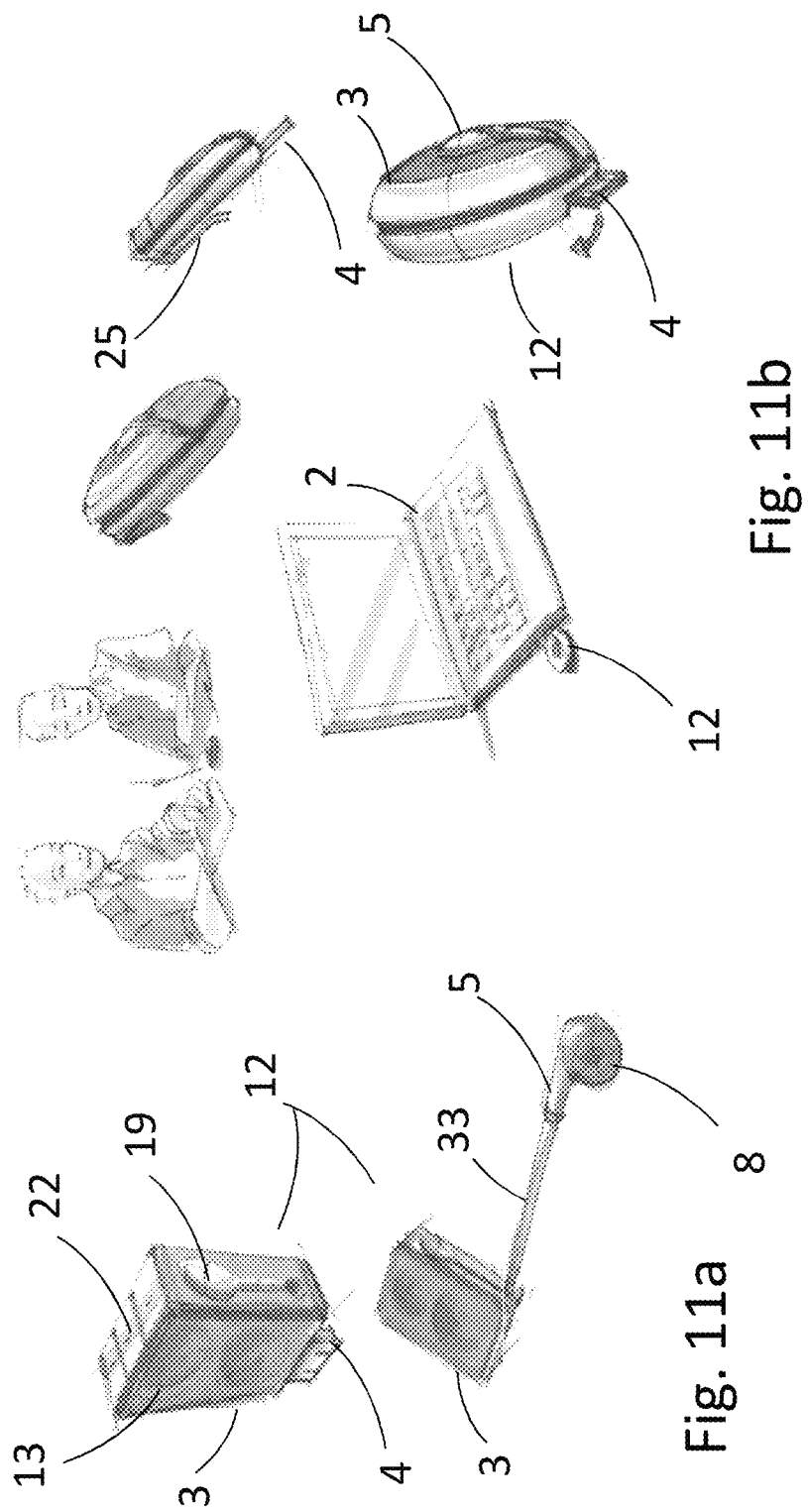

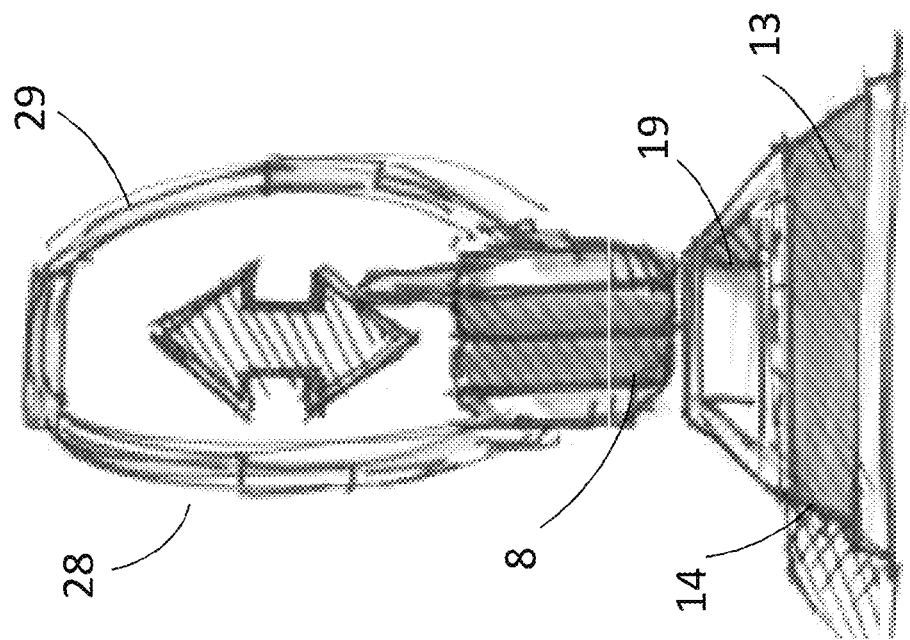
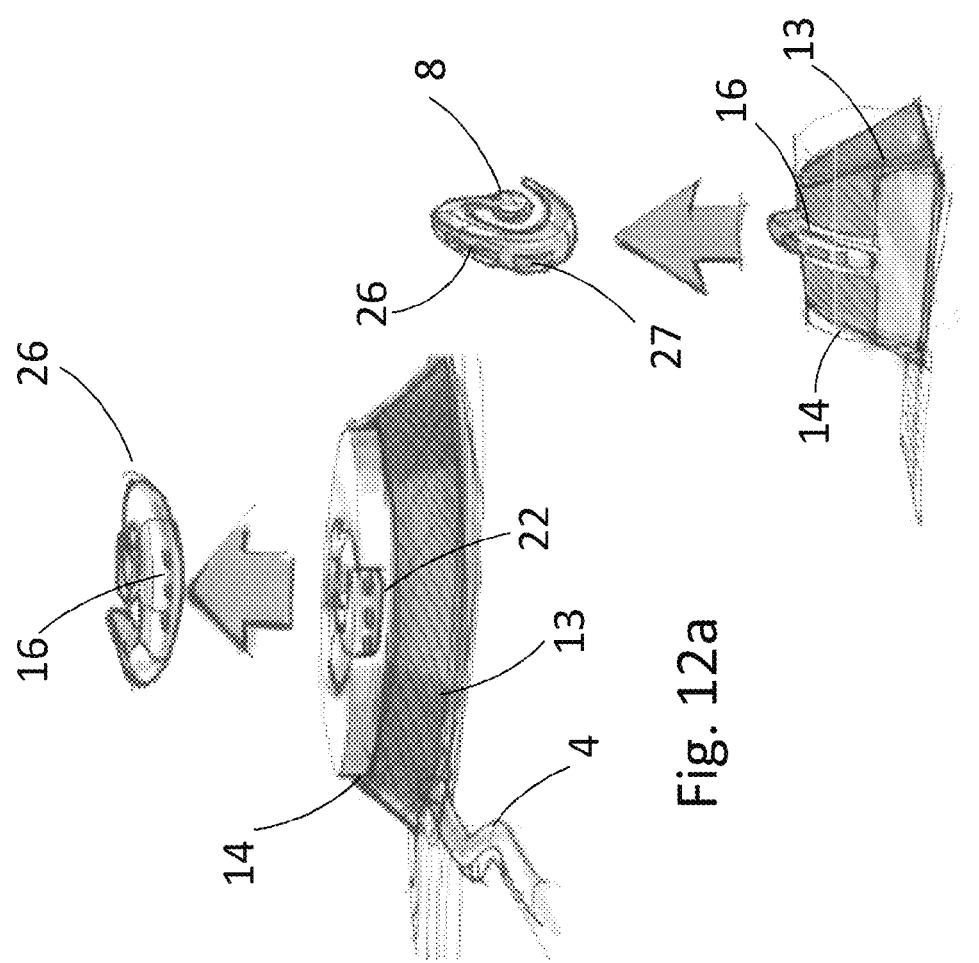
Fig. 12a  Fig. 12b  Fig. 12c

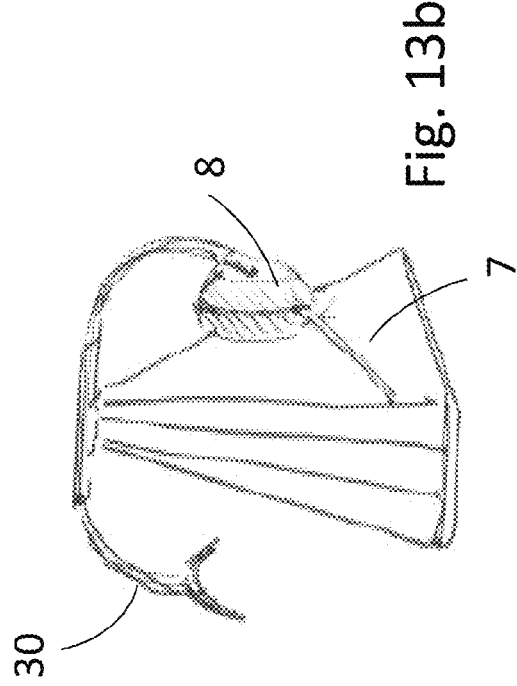
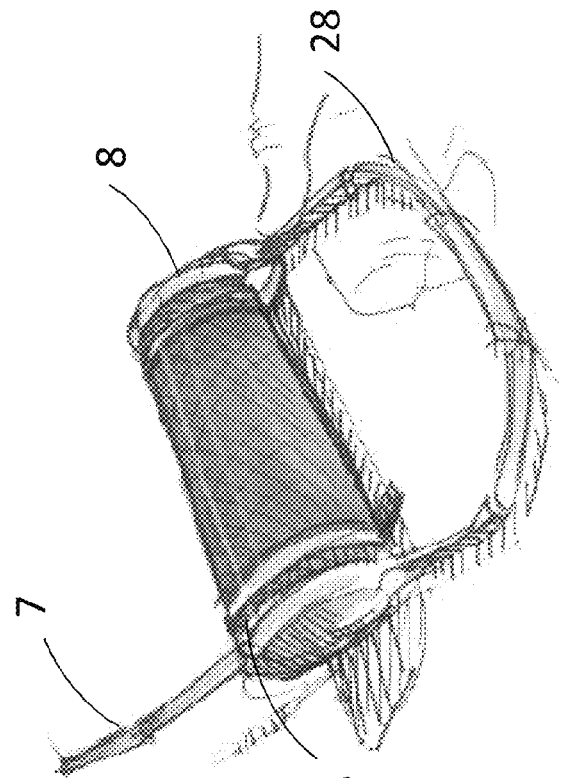
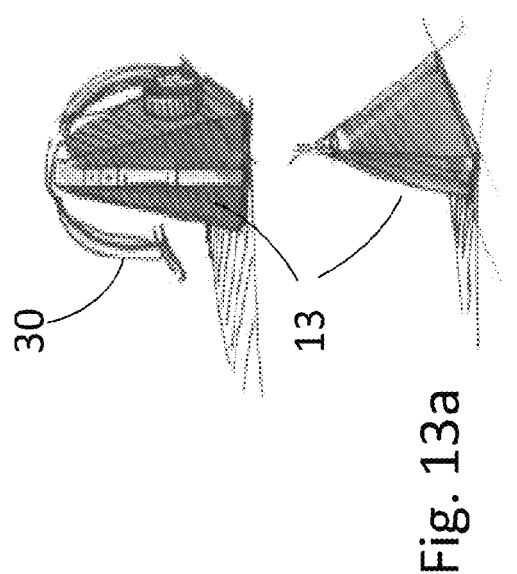
Fig. 13a
Fig. 13b
Fig. 13c

PERSONAL CONFERENCING DEVICE

FIELD OF INVENTION

The present invention relates to personal conferencing devices, such as to headsets/handsets to be received in a base unit, more specifically, the invention relates to headsets/handsets having conference calling capabilities.

BACKGROUND OF THE INVENTION

It is known in the art of conference calling to have a telephone with a speaker and a microphone integrated in the base of the phone for receiving audio from the surroundings and providing audio to the immediate surroundings, such as in a meeting room or an office environment. It is also known to provide a special conference calling hub connected to a standard phone for providing conference call functionality. Typically, the separate conference calling hubs will have a number of microphones and speakers distributed around the hub to obtain an improved reception of audio from the surroundings and further provide a better quality audio in multiple directions.

It is further disclosed in U.S. Pat. No. 7,110,789 to provide an interface from a conference calling hub to a cellular phone, so that the conference calling hub is connected to the wireless network when the cellular phone is engaged in the docking station or conference calling hub. The cellular phone may be controlled via the conference calling hub. The conference calling hub also comprises a handset which can be used in substitution of the microphone and the speaker in the cellular phone, when the cellular phone is engaged with the hub.

Such conference calling hubs are typically bulky and expensive and only provided in e.g. meeting rooms.

In U.S. Pat. No. 7,574,239, a docking station having passive components, such as speaker and microphone is disclosed. A headset communicating with a cellular or mobile telephone may be positioned in the docking station. When the headset is positioned in the docking station, the headset microphone and speaker are deactivated and the docking station microphone and speaker are used to communicate audio to and from a user. This is an advantage for use with e.g. a hands free operation of a car.

It is furthermore known to have a system of headsets with base units, wherein the base units are able to receive a number of headsets. Hereby, a number of users can connect to a current conversation by docking their headset in the base unit of the caller for a short time period (typically a few seconds) to establish a temporary pairing and connection to the callers' base unit. These users may then take part in the call through their own headsets.

However, it is a disadvantage of the above described systems that a base unit or conference calling hub is necessary for providing conference calling functionality for a headset, thus limiting the portability of the systems.

SUMMARY OF THE INVENTION

It is an object of the present invention to provide a conference calling functionality having increased portability. It is a further object of the invention to provide a personal conferencing device in which a user can easily choose between conference functionality and private functionality.

According to the invention a personal conferencing device having a base unit and a headset/handset is provided, wherein the base unit comprises a first interface to a telephone system, such as a soft phone, a mobile phone or a desk phone, and
a headset/handset receiving part for receiving a headset/handset. The headset/handset comprises
a base connection adapted to be received in the receiving part,
at least a first microphone for receiving audio from a headset/handset user, and at least a first headset/handset speaker for providing audio to a headset/handset user. The headset/handset further comprises
a position detecting device for detecting a position and/or a state of the headset/handset, and at least a second headset/handset speaker,
wherein audio is provided to a headset/handset user via the second headset/handset speaker (9) in response to a first signal provided from the position detecting device (10).

The telephone system may be any telephone system, such as a soft phone, a mobile phone, a landline based phone system, such as a desk phone, and the interface from the base unit may be wired or wireless; the base unit may connect to the telephone system via a computer, and connect to the computer via any conventional connection, such as via a USB connector. It is envisaged that the first interface may comprise audio and power connections.

The base unit may further comprise a base speakerphone incorporated in the base unit and the personal conferencing device may be adapted to deliver audio to the base speakerphone when the headset/handset is received in the base unit and to the headset/handset speaker when the headset/handset is removed from the base unit. Thus, for a user using the personal conferencing device, e.g. at a desk, it may be convenient to receive audio via the base unit. It is advantageous for a user, especially for shorter conversations, that the user can avoid picking up the headset/handset but may continue working, while receiving a shorter phone call. However, should the conversation turn out to be longer, or should the user desire more privacy, the user can easily pick up the headset/handset and continue the conversation which is now automatically directed to the headset/handset speaker. The headset/handset may communicate with a base unit and/or a dongle in any conventional way, such as wired or wireless, such as via Bluetooth, DECT, etc. It is an advantage of the personal conferencing device according to the invention that the user can easily choose between conference functionality and private functionality.

The base unit may further comprise a base microphone for receiving audio from a user when the headset/handset is received in the base unit.

The coupling between the headset/handset receiving part for receiving the headset/handset, and the base connection adapted to be received in the headset/handset receiving part, may be made in any conventional way, e.g. so that an electrical interface or connection to the headset/handset is established when the headset/handset is received in the receiving part. Thus, the base unit may be a docking station for the headset/handset. The headset/handset may comprise a switching circuit adapted to switch an electrical connection to the base speaker and the base microphone when the headset is received in the receiving part, and for switching the electrical connection to the microphone and loudspeaker of the headset when the headset is removed from the base unit.

The headset/handset may be any conventional headset/handset, and the handset may be in the form of a stick or a telephone handset form, etc. The headset/handset may further be wired or wireless. The headset may be a headset having one or two headset speakers, and may have an earhook, a neckband or a headband as any conventional headset. In an embodiment, the headband, earhook or neckband may be foldable and/or disconnectably connected to the headset/handset to minimize space use.

The position detecting device for detecting a position and/or a state of the personal conferencing device may be any positional sensor, such as a directional sensor, a tilt sensor, an accelerometer, a magnetometer, a switch, such as a hall switch, a mechanical switch, etc. as known in the art. The position device may detect the rotational position of the headset/handset, such as a vertical and/or horizontal positioning of the headset/handset. Preferably, the position detecting device is capable of detecting if the headset/handset is in motion or not, so that the position detecting device additionally or alternatively comprise a movement detecting unit. The position detecting device is adapted to provide a first signal in response to a first state of the headset/handset, such as by emitting or conducting the signal. The first state may be a predetermined position of the headset/handset, e.g. a state wherein the headset/handset is positioned on a plane surface, such as a table, or a state wherein the headset/handset is at rest, etc, and any combination thereof. In response to the first signal provided from the position detecting device, audio is directed to the second headset/handset speaker. The first signal may thus be provided to headset/handset electronics, such as a headset/handset electrical or electronic circuit in response to which predetermined speakers and/or microphones are activated and/or deactivated. It is envisaged that the second headset/handset speaker may be the first headset/handset speaker configured differently, e.g. configured to provide audio at a higher volume, such as at a volume whereby the audio is audible for a user not having the speaker next to an ear. The headset/handset electrical or electronic circuit may connect headset/handset speakers, headset/handset microphones, base speakers and any base microphone in any known way, and may further comprise Bluetooth means, processing means, such as microphone signal processing means, etc. and may further connect to a base unit electrical or electronic circuit connecting to base microphones, base speakers and the telephone system. The base unit may further comprise Bluetooth technology for communicating with the headset/handset. Thus, a signal provided from the position detecting device, such as a signal provided to the headset/handset electrical or electronic circuit, emitted from a position detecting device, such as an accelerometer, indicating that the headset/handset is not moving, possibly coupled with other signals, such as signals indicating that the headset/handset is active and disconnected from the base unit, will trigger using the second headset/handset speaker. The other signals may also be emitted from the position detecting device. The position detecting device may also detect a specific position of the headset/handset, such as detecting when a headset/handset is positioned in a laying or standing manner on a plane surface.

The headset/handset may further comprise a second microphone adapted to receive audio from a user when the headset/handset is received in the base unit and/or in response to the first signal emitted from the position detection device. The second microphone may be a microphone, such as an omni-directional microphone, especially adapted to receive audio from one or more users in the second microphone environment. Thus, the second microphone may be used as an alternative to a base microphone and/or the second microphone may be used to receive audio when the headset is in the first state, such as in a conference calling state. The second microphone may be arranged on the headset/handset so as to minimize any acoustic feedback from the first and/or second speaker.

The first and second headset/handset microphone may be a single microphone, and the first and the second headset/handset speaker may be a single speaker. This is advantageous for minimizing the component use for the headset/handset. It is however envisaged that the quality of the audio reception and transmission may be optimized by using separate first and second speakers and/or microphones in that the components may then be optimized for the specific use.

The telephone system may be a computer based phone system and the headset/handset may be charged from the computer via the receiving part.

The first interface between the base unit and the telephone system may be any conventional connection such as a USB connection, a wired connection or a wireless connection. In one embodiment the base unit may comprise an integrated USB plug for connecting the base unit to the telephone system.

The personal conferencing device may further comprise a rotatable part for moving the personal conferencing device, or at least a part thereof, into a transport position while connected to the phone system. This is especially advantageous when connecting the personal conferencing device to the phone system via a USB connection to a portable computer. It is an advantage of having the personal conferencing device plugging directly into the computer via e.g. an integrated USB plug so that the portability of the system increases. It is a further advantage of the increased portability that a user may use the phone from anywhere, e.g. in meeting rooms, other offices, etc.

The personal conferencing device may comprise a dongle, a base unit and a headset/handset. In this configuration, the dongle is adapted to connect to a computer and communicate with the headset/handset and the base unit via a build-in Bluetooth unit. The driver software may be installed on the computer via the dongle and the base unit is typically connected with a standard telephone system. In this way, one personal conferencing device may be used with a number of phone systems, i.e. a standard telephone, a pc soft phone or a mobile phone.

The personal conferencing device may further comprise a user interface, such as a user interface including answering, muting and volume functions, via push buttons, scrolling buttons or via an MMI interface, and may include indicators, such as diodes, such as LEDs, for indicating status of a function, i.e. muted, call forwarding on, etc. The user interface may be provided on the headset/handset and/or on the base unit. The base unit may further comprise a dongle for connection to the computer soft phone.

Figure 7A:
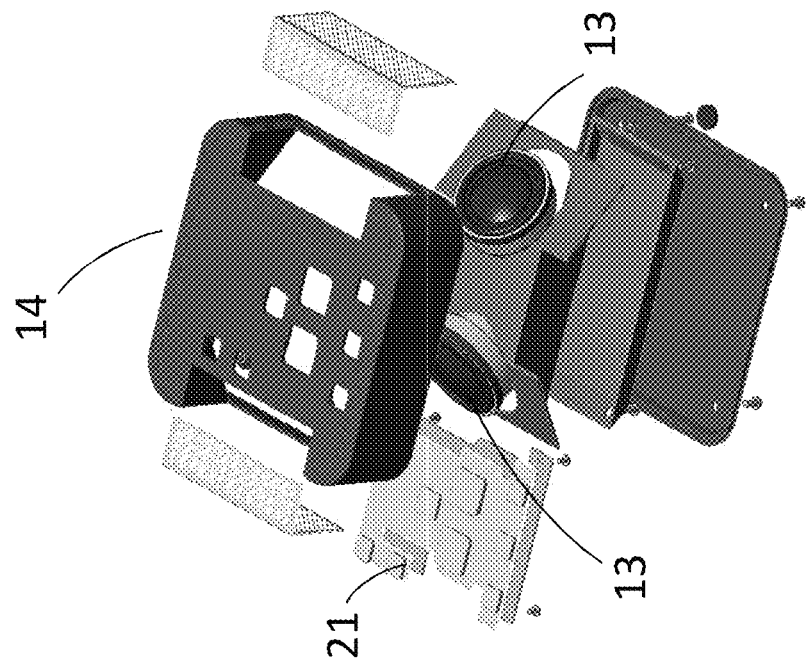
Figure 7B:
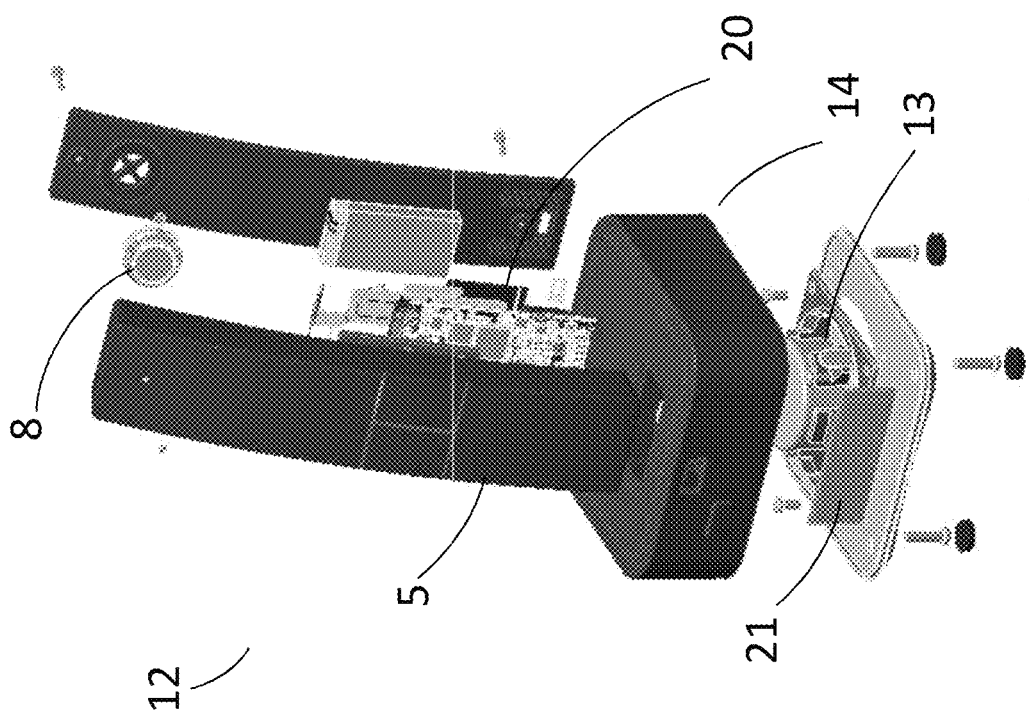
Figure 14A:
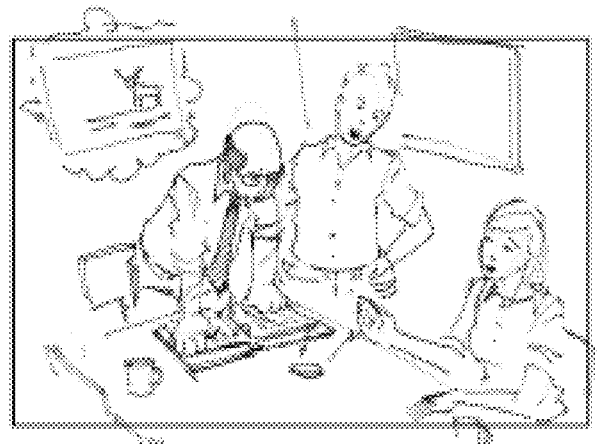
Figure 14B:
Figure 14C:
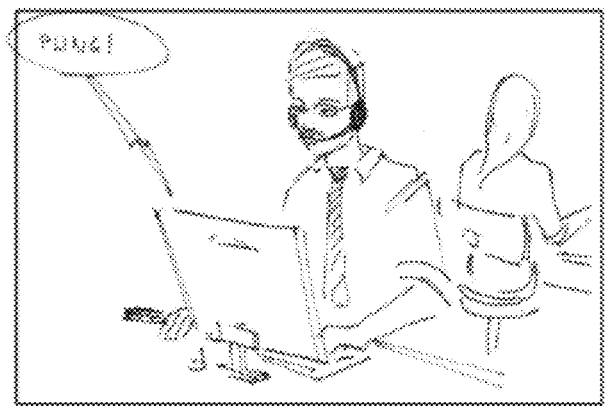
Figure 15A:
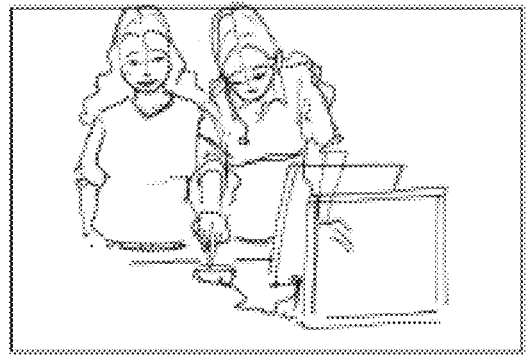
Figure 15B:
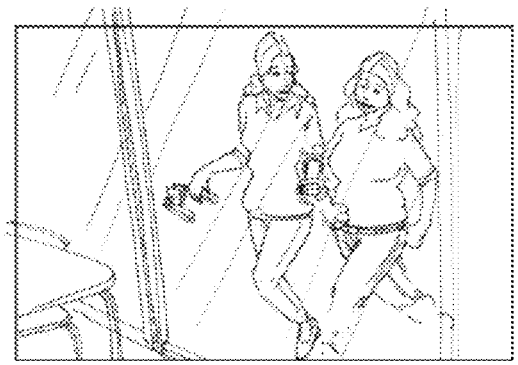
Figure 15C:
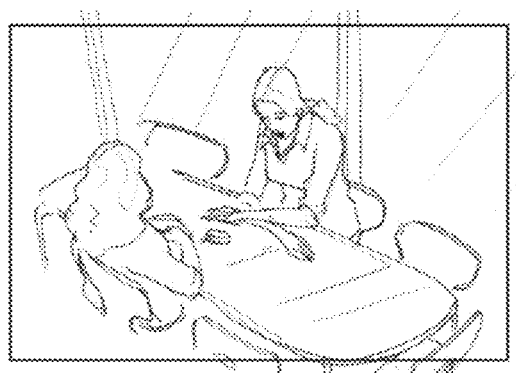
Figure 16A:
Figure 16B:
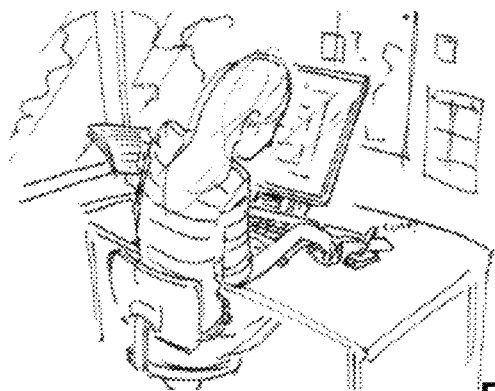
Figure 16C:
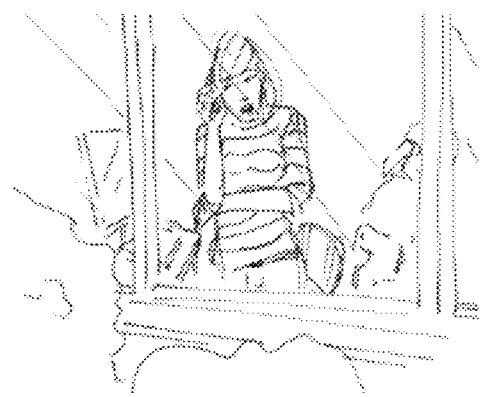

The invention will now be described in more detail by way of example only, with reference to the accompanying drawings. In the drawings, wherein like reference numerals reference same features:

FIG. 1 shows schematically a personal conferencing device connected to a computer, FIGS. 2a-c shows a personal conferencing device and the connection to the computer in more detail, FIGS. 3a-d shows an embodiment of the invention having additional features, FIGS. 4a-b shows a personal conferencing device in conference mode and received mode, FIGS. 5a-d shows different embodiments of a personal conferencing device connected to a computer, FIGS. 6a-b shows a handset, FIGS. 7a-b shows an exploded view of a handset and a base unit, FIGS. 8a-b shows a personal conferencing device and an exploded view of a personal conferencing device, FIGS. 9a-9c shows different embodiments of a personal conferencing device, FIGS. 10a-d shows other embodiments of a personal conferencing device, FIGS. 11a-b shows yet other embodiments of a personal conferencing device, FIGS. 12a-c shows alternative embodiments of a personal conferencing device, FIGS. 13a-c shows yet other embodiments of a personal conferencing device, FIGS. 14a-c show a typical meeting situation, FIGS. 15a-c show another example of using the personal conferencing device according to the present invention, FIG. 16a-c shows yet another example of using the personal conferencing device according to the present invention.

FIG. 1 shows an embodiment of a personal conferencing device according to the invention. The system 1 comprises a headset/handset 5 in communication with dongle or base unit 3 which is connected to a computer 2 via connection 4. The handset is shown in two different modes; a private mode 5' wherein the handset is handheld and a conference mode 5" wherein the handset is positioned on a table. The handset comprises a position sensor 10, which determines a position of the handset and on the basis of this determination the handset is set to a private mode or a conference mode. In the private mode the handset microphone 7 and the handset speaker 8 is activated so as to allow a user to speak in private. In the conference mode the second handset speaker 9 is activated for providing audio and/or voice communication to the surroundings. The microphone used in the conference mode may be the handset microphone 7 or it may be an additional microphone specifically adapted to receiving audio from the surrounding environment. The handset may be received in the dongle 3 connected to the computer 2 e.g. for charging and the handset may also be used in conference mode when received in the dongle 3.

FIG. 2a-c shows a personal conferencing device 12 and the connection to the computer 2 in more detail. In this embodiment, the dongle 3 connects directly to the computer 2 via a USB connector 4 integrated with the dongle. The dongle 3 comprises a base speaker 13 which may be used to provide audio when the handset 5 is received in the dongle. In FIG. 2c, the conferencing device with handset 5 received in the dongle 3 is shown. It is seen that the conferencing device may be movable between a position being well-suited for transportation, i.e. when the handset 5 is parallel to the computer 2, and a position being well-suited for use, i.e. an upright position, optimized for receiving audio from a user in front of the computer. The conferencing device may further comprise a safety feature as illustrated by the arrow 6 only allowing the handset 5 to be disconnected from the dongle 3 in the use position. Thereby, the risk of losing the handset 5 during transportation of the laptop 2 with the personal conferencing device 12 inserted is reduced.

FIG. 3a shows a personal conferencing device 12 comprising a base unit 14 and a handset 5 received in the base unit. FIG. 3b, illustrates possible additional features of the handset 5, so the handset may comprise a muting function 18 and a volume control 17 for adjusting the volume of the active speaker, either handset speaker 8 or second handset speaker 9, as shown in FIG. 1. In FIG. 3c additional control buttons are provided on the base unit 14. Furthermore, receive/reject call buttons 15 are provided on the handset in addition to handset LED's 16 provided to indicate a status of the handset, e.g. status of the system, indication of incoming call, etc. FIG. 3d shows another combination of features for the personal conferencing device, having base unit control buttons 22, receive/reject button(s) 15 and LED's 16 positioned on the handset.

FIG. 4a shows a personal conferencing device 12 connected to a telephone system via connection 4. The base unit 14 has a base receiving part 19 for receiving handset 5, and the handset 5 has a base connection 31. The handset 5' is shown in the conference mode having first and second handset speakers 8, 9 and a second handset microphone 23. It is envisaged that a handset microphone (not shown in FIG. 4a) for use in private mode is positioned on the other side of the handset 5'. Likewise, also a handset speaker for private mode conversations may be provided on the other side of the handset 5'

FIG. 4b shows another embodiment of a personal conferencing device 12. The handset 5" is shown in an upright position standing on the table, and is in this position in conferencing mode. The handset 5 has a base connection 31 and the base unit 14 has a base receiving part 19 for receiving the handset. The base unit 14 has a number of base unit control buttons 22 for e.g. receiving a call, rejecting a call, etc. The handset 5 has a second speaker 9, handset speakers 8 and a second microphone 23 for use when the device is in the conference mode. When the handset is in the conference mode, it is envisaged that any one or all of the second speaker 9 and handset speakers 8 may be used. In private mode, one or both of the speakers 8 may be used, e.g. to allow for left-hand and right-hand use of the handset.

FIGS. 5a-d show a number of embodiments of personal conferencing devices directly connected to the computer, preferably via a USB connection, but any standard connection may be used. In FIGS. 5a-d, the dongle 3 comprise a dongle or base unit speaker 13. The handset 5 has handset microphone 7 and handset speaker 8. As illustrated in FIG. 5b, the handset may be rotatable around the base unit between an optimized operating position and a transport position. It is envisaged that the personal conferencing device may be continuously activated, also when positioned in the transportation mode.

FIGS. 6a and 6b show the handset 5 of FIG. 5a in more detail. It is seen that the handset 5 may be rotated to e.g. change between different functionalities of the handset, such as to change between private mode and conference mode. The switch may be implemented using Hall switches to change e.g. the transfer characteristics for the speakers and/or change the volume, e.g. so that the volume is turned up in conference mode, and the switch may be used to switch between different or additional speakers. The switch is thus a position sensing device 10 providing the first signal to indicate the mode to the base unit and/or dongle and/or to the headset/handset.

In FIG. 7a, an exploded view of a personal conferencing device is shown. The handset comprises a handset speaker 8 and handset electronics 20 is also provided for signal processing, wireless communication, etc. The base unit 14 comprises a base speaker 13. FIG. 7b shows an exploded view of an alternative base unit 14 comprising base unit electronics 21, and two base unit speakers 13.

FIG. 8a shows a personal conferencing device 12, having a handset 5 and a base unit, dongle 3 having a base speaker 13 and being connectable to a computer or other telephone system via connection 4. The length of the dongle 3 in this specific embodiment is 49 mm, and the diameter of the dongle 3, and thus of speaker 13, is 22 mm. In FIG. 8b, an exploded view of the personal conferencing device is provided showing 21 base unit electronics 21, base unit speaker 13, and handset electronics 20.

FIG. 9a-c show different embodiments of a personal conferencing device 12, connected to a base unit 14. The headset/handset in these embodiments comprises a headset/handset speaker having the shape of a typical in-ear headset speaker.

The headset/handset may thus either be handheld or the speaker 8 may be positioned in the ear for holding the headset/handset from the ear. The base unit 14 may comprise a base speaker 13 and the base unit 14 may further comprise control buttons 22. As best seen in FIG. 9a, the handset/headset may have an upright position optimized for receiving and providing audio to the surroundings, and a transportation/storage position, as shown in FIG. 9c. It is envisaged that the handset/headset also may be active in the transportation/storage position.

FIG. 10a-d show different embodiments of a personal conferencing device 12 connected to a base unit 14 or a dongle 3. The headset/handset in these embodiments comprises a headset/handset speaker having the shape of a typical in-ear headset speaker. The headset/handset may thus either be handheld or the speaker 8 may be positioned in the ear for retaining the headset/handset. The base unit 14 may comprise a base speaker 13 and the base unit 14 may further comprise control buttons 22. The receiving part 19 of the base unit 14 may receive the handset/headset in a sliding manner as seen in FIG. 10a, or the receiving part 19 may have an indentation 32 for receiving and holding the in-ear headset speaker 8. FIG. 10c shows a handset/headset having an in-ear headset speaker 8 positioned in a dongle 3 and being movable between a transportation/storage position and a position optimized for receiving and providing audio to a user.

FIGS. 11a-b illustrate yet other embodiments of a personal conferencing device 12 according to the present invention integrating a headset 5 with the dongle 3. As shown in FIG. 11a, the headset may have a headset speaker 8 on a telescopic attachment 33. In FIG. 11b, the headset is shown foldable around the dongle 3. Furthermore, the dongle 3 has a clip 25 for fastening the dongle or a part thereof to e.g. a belt.

The FIGS. 12a-c illustrate a personal conferencing device 12 having a headset 26 connected to a base unit 14. The headset 26 illustrated in FIGS. 12a and 12b, is a headset having a behind-the-ear wearing style, whereas the headset as illustrated in FIG. 12c is a stereo-headset 28 having two headset speakers 8 and a headband 29 connecting these. In FIGS. 12a-c, the base unit 13 receives the headset in receiving part 19.

Still other embodiments of the invention are illustrated in FIGS. 13a-c. FIGS. 13a and 13b illustrate a mono-headset 30 with a headband for holding the headset in place. The headset comprises a pick-up unit with microphone 7. FIG. 13c illustrates a further embodiment of a stereo headset having two headset speakers 8, and a pick-up unit with microphone 7.

The invention will know be illustrated by way of a few examples of practical application of the invention. FIGS. 14a-c show a typical meeting situation. Jane is in a meeting at a client's office along with a couple of her colleagues. She is using her personal conference device 12. As positioned on the table the device is in conference mode, FIG. 14a. After a healthy discussion, her colleagues at the other end want to talk to her in private for a moment, so Jane lifts up the personal conference device and unfolds and position the headset, activating the in-private mode by changing the position of the device, FIG. 14b. Her colleagues back home can now give her some advice without the clients listening in, FIG. 14c. By returning the personal conferencing device to the table, the meeting can continue in conference mode, not shown.

FIGS. 15a-c show another example of using the personal conferencing device according to the present invention. In FIG. 15a, Mary is in a telephone call; she is wearing the headset and is in the privacy mode. Mary's colleague Anna has just arrived at Mary's desk so Mary turns on the speaker on her conferencing device to include Anna in the conversation. They soon realize that the matter needs a bit further discussion in a quiet place, so Mary takes the headset along, and they walk to a nearby meeting room, as illustrated in FIG. 15b. Mary positions the headset on the table and they can continue their discussions in conference mode, as seen in FIG. 15c.

FIG. 16a-c shows another example of using the personal conferencing device according to the present invention. FIG. 16a shows Jane at her desk working. In FIG. 16b she pushes the accept button to accept a call on the personal conferencing device. She leaves the handset in the base unit so the call is put on speaker. The conversation turns private so Jane grabs the handset and walks to the window where she can talk with some privacy, FIG. 16c.

The invention has been illustrated in numerous ways and yet it is envisaged that the embodiments may be combined in any way to include a further multiplicity of embodiments as will be readily acknowledged by the person skilled in the art. For example, features only illustrated with personal conferencing devices having handsets may be applied equally to personal conferencing devices having headsets, and vice versa, etc.

LIST OF REFERENCE NUMERALS

1 Personal conference system
2 Computer
3 Dongle
4 Connection
5 Headset/handset
6 Arrow
7 First handset microphone
8 First handset speaker
9 Second handset speaker
10 Position sensor
12 Personal conferencing device
13 Base speaker
14 Base unit
15 Receive/reject call buttons
16 Headset/handset LED's
17 Volume control
18 Speaker on/off button
19 Headset/handset receiving part
20 Handset/headset electronics
21 Base unit electronics
22 Base unit control buttons
23 Second handset microphone
25 Clip
26 Headset earhook
27 Headset control
28 Stereo headset
29 Headband
30 Mono headset with headband
31 Base connection
32 Indentation
33 Telescopic attachment

The invention claimed is:

1. Personal conferencing device having a base unit and a headset/handset, wherein the base unit comprises: a first interface to a telephone system, and a headset/handset receiving part for receiving a headset/handset, the headset/handset comprises: a base connection adapted to be received by the receiving part, at least a first microphone for receiving audio from a headset/handset user, and at least a first headset/handset speaker for providing audio to a headset/handset user, a position detecting device for detecting a position and/or a state of the headset/handset, and a second headset/handset speaker, wherein audio is provided to a headset/handset user via the second headset/handset speaker in response to a first signal provided from the position detecting device.

2. A personal conferencing device according to claim 1, wherein the base unit further comprises a base speakerphone.

3. A personal conferencing device according to claim 2, wherein the personal conferencing device is adapted to deliver audio to the base speakerphone when the headset/handset is received in the base unit and wherein the personal conferencing device is adapted to deliver audio to the first and/or second headset/handset speaker when the headset/handset is removed from the base unit.

4. A personal conferencing device according to claim 1, wherein the headset/handset is in the form of a stick or a telephone handset.

5. A personal conferencing device according to claim 1, wherein the first signal is emitted from the position detecting device when the personal conferencing device is positioned on a plane surface.

6. A personal conferencing device according to claim 1, wherein the first interface includes audio and power connection.

7. A personal conferencing device according to claim 1, wherein the headset/handset further comprises a second microphone adapted to receive audio from a user when the headset/handset is received in the base unit and/or in response to the first signal emitted from the position sensing device.

8. A personal conferencing device according to claim 1, wherein the first and second microphone is a single microphone, and/or wherein the first and the second speaker is a single speaker.

9. A personal conferencing device according to claim 1, wherein the phone system is a computer based phone system and wherein the headset/handset is charged from the computer via the receiving part.

10. A personal conferencing device according to claim 1, wherein the first interface is a USB connection, a wired connection or a wireless connection.

11. A personal conferencing device according to claim 1, further having an integrated USB plug.

12. A personal conferencing device according to claim 1, wherein the headset/handset includes a headband, an earhook or a neckband being foldable and/or disconnectably connected to the headset/handset to minimize space use.

13. A personal conferencing device according to claim 1, further having a rotatable part for moving the personal conferencing device to a transport position while connected to the phone system, especially when connecting to the phone system via a USB connection.

14. A personal conferencing device according to claim 1, further comprising a user interface, such as a user interface including answering, muting and volume functions, via push buttons, scrolling buttons or via an MMI interface.

15. A personal conferencing device according to claim 1, wherein the base unit comprises a dongle for connection to a computer soft phone.

16. A personal conferencing device according to claim 1, wherein the headset/handset is set to a private mode wherein the first headset/handset speaker is activated, or is set to a conference mode in which the second headset/handset speaker is activated based on the detected position and/or state of the headset/handset.

* * * * *